United States Patent [19]
Diamond et al.

[11] Patent Number: 5,680,447
[45] Date of Patent: Oct. 21, 1997

[54] CIRCUIT AND METHOD FOR RESPONDING TO THIRD PARTY CALLS IN A TELEPHONE SYSTEM HAVING CALL WAITING

[75] Inventors: Robert L. Diamond, Bedford, N.Y.; Steven L. Landry, San Jose; Kamran Khojasteh, Morgan Hill, both of Calif.

[73] Assignee: Cidco, Inc., Morgan Hill, Calif.

[21] Appl. No.: 457,664

[22] Filed: May 31, 1995

[51] Int. Cl.$^6$ ........................ H04M 3/42
[52] U.S. Cl. ............ 379/215; 379/142; 379/88
[58] Field of Search ........................ 379/215, 142, 379/201, 67, 68, 127

[56] References Cited

U.S. PATENT DOCUMENTS

| | | | |
|---|---|---|---|
| 4,661,975 | 4/1987 | Brecher | 379/215 |
| 4,873,719 | 10/1989 | Reese | 379/215 |
| 5,007,076 | 4/1991 | Blakley | 379/215 |
| 5,263,084 | 11/1993 | Chaput et al. | 379/215 |

*Primary Examiner*—Ahmad F. Matar
*Attorney, Agent, or Firm*—Skjerven, Morrill, MacPherson, Franklin & Friel; Alan H. MacPherson; E. Eric Hoffman

[57] ABSTRACT

A method and circuit which allows a telephone user having a conversation with a second party in a telephone system having call waiting to effectively respond to an incoming call from a third party without having to engage in conversation with the third party. To accomplish this, the user presses a key on a customer premises equipment (CPE) which initiates a first flash hook operation which places the second party on hold and connects the CPE to the third party. A pre-recorded message corresponding to the pressed key is then transmitted to the third party. The CPE then performs a second flash hook operation which disconnects the third party and removes the second party from the hold state. A plurality of keys, having a corresponding plurality of pre-recorded messages can be provided, thereby allowing the user to respond to the third party with different messages. The CPE can include CIDCW capabilities which enable the user to learn the identity of the third party before selecting the pre-recorded message.

17 Claims, 5 Drawing Sheets

CIRCUIT AND METHOD FOR RESPONDING TO THIRD PARTY CALLS IN A TELEPHONE SYSTEM HAVING CALL WAITING

BACKGROUND OF THE INVENTION

1. Field of the Invention

The present invention relates to a structure and method for operating a telephone system. More specifically, the present invention relates to a structure and method for responding to an incoming telephone call in a telephone system which implements call waiting (CW) and caller identification (CID) or a telephone system which implements caller identification with call waiting (CIDCW).

2. Description of the Prior Art

Call waiting and caller identification are well known concepts in the telephone industry. With call waiting, a telephone user who is speaking with a second party on the telephone receives a subscriber access signal (SAS) tone from the telephone company central office when the user has another incoming call from a third party. The SAS tone is audible in the user's telephone receiver. After hearing the SAS tone, the user has the choice of ignoring the incoming call or answering the incoming call by pressing a preselected button (or the hookswitch) of the telephone. If the user answers the incoming call, the second party is placed on "hold."

With caller ID, the telephone company transmits encoded information to the user's telephone between the first and second ring signals. This encoded information (caller ID information) typically includes the name and telephone number of the calling party. The user may purchase or lease customer premises equipment (CPE) which connects to the user's telephone line and detects, decodes and displays the encoded information. For the CPE to properly process the caller ID information, the telephone must be in an on-hook condition when the caller ID information is received. As used herein, the term "on-hook" refers to the condition which generally exists when the handset of the telephone is resting on the hookswitch of the telephone and the term "off-hook" refers to the condition which generally exists when the handset of the telephone is removed from the hookswitch of the telephone.

Caller ID and call waiting can both be separately implemented by a telephone user. This system is referred to as a caller ID and call waiting (CID & CW) system. In a CID & CW system, the user receives and displays caller ID information when a second party calls the user and the user's telephone is in an on-hook condition. Additionally, the user will receive a SAS tone when a third party calls while the user is talking to the second party. Although the user is informed when a third party is calling, the user does not receive the caller ID information of the third party.

The two concepts of caller ID and call waiting have also been combined to create caller ID with call waiting (CIDCW). CIDCW requires that the telephone user have a CPE (or the equivalent) connected to the telephone line. When the user is speaking on the phone with a second party and receives a call from a third party, a SAS tone followed by a CPE alerting signal (CAS) tone is transmitted from the telephone company central office to the user's CPE. The CAS tone is similar to a dual tone multi-frequency (DTMF) signal, but has higher frequencies and is of a lower amplitude. The CPE detects the CAS tone and then transmits an acknowledge signal to the telephone company central office. The acknowledge signal has been defined to be the DTMF signal "D". During the transmission of the acknowledge signal, the CPE disconnects the voice path of the user's telephone and the telephone company central office mutes the acknowledge signal so that the second party does not hear the acknowledge signal. Upon detecting the acknowledge signal, the telephone company transmits the caller ID information to the user's CPE. The CPE detects and displays the third party's caller ID information and communication is re-established with the second party.

In both CID & CW systems and CIDCW systems, the user may not wish to speak with the third party immediately, but would rather continue the ongoing conversation with the second party. In both CID & CW systems and CIDCW systems, if the user does not answer the third party's call, the third party hears continued ringing. Thus, the third party typically does not know whether the user is on the phone with a second party or whether the user is not home. Therefore, if the user does not answer the third party's call, the third party typically obtains no useful information from the user. Additionally, the user can not provide any useful information to the third party without answering the third party's call.

If the user does answer the third party's call in an attempt to briefly assure the third party that the user is available (in a CID & CW system) or that the caller ID information was received and that the user will later return the third party's call (in a CIDCW system), the user runs the risks of (1) being detained by the third party, thereby undesirably interrupting the conversation with the second party and/or (2) appearing rude in attempting to limit the conversation with the third party to only a brief message.

It would therefore be desirable to have a structure and method which would provide a telephone user with more flexibility in responding to third party calls in telephone systems which implement CID & CW and CIDCW.

SUMMARY

Accordingly, the present invention provides a circuit having one or more keys, each of which can be pressed to transmit a pre-recorded message to a third calling party in a CID & CW system or a CIDCW system.

In a CID & CW system, when the user is talking to a second party and receives a SAS tone which indicates that a third party is calling, the user can press a key which transmits a pre-recorded message to the third party. This message can state, for example, "I'm currently on the phone with another party. Please call again in several minutes." Alternatively, several keys can be provided such that the user can give the third party an estimate as to how long the conversation with the second party will last. In such a system, a first key may instruct the third party to call back in five minutes and a second key may instruct the third party to call back in a half an hour.

In a CIDCW system, when the user is talking to a second party and receives caller ID information concerning an incoming call from a third party, the user can press a key which transmits a pre-recorded message to the third party. This message can state, for example, "I'm currently on the phone with another party. I have your caller ID information and will call you back when I complete my current conversation." Several keys can be provided such that the user can give the third party an estimate as to how long the conversation with the second party will last.

Such a system advantageously allows the user to dispose of the third party without substantially interrupting the conversation with the second party and without a confrontation with the third party.

More specifically, the present invention includes a method for allowing a user engaged in a telephone call with a second party to respond to an incoming call from a third party. The method can be implemented in either a CID & CW system or a CIDCW system. The method includes the step of monitoring a first key to determine if the first key is pressed. If the first key is pressed, a first flash hook operation is performed, thereby providing a connection to the third party and placing the second party on "hold". A pre-recorded message associated with the first key is transmitted to the third party and a second flash hook operation is performed, thereby re-connecting the second party. In a particular implementation, the user's telephone is temporarily disconnected from the telephone system during the time that the pre-recorded message is transmitted.

In another embodiment, additional keys are added, with each key having a corresponding pre-recorded message.

The pre-recorded message can be a standard message or can be a personalized message recorded by the user. The pre-recorded message can be stored in a memory device as a plurality of digital signals which are transmitted to a voice synthesizer circuit to generate a voice message.

In a particular implementation, the method can include the steps of monitoring the telephone system to determine whether the telephone is in an off-hook condition and transmitting the pre-recorded message to the third party only if the telephone is in an off-hook condition.

The present invention also includes a circuit which allows a user engaged in a telephone call with a second party to respond to an incoming call from a third party. The circuit can be used in telephone systems having CID & CW or CIDCW. The circuit includes a microcontroller, a first key, a line termination and signal transmission path circuit, an off-hook detect circuit and a signal generation circuit. The first key is coupled to the microcontroller such that the microcontroller can monitor the first key to determine if the first key is pressed. The line termination and signal transmission circuit is coupled to the telephone system and the microcontroller. If the first key is pressed, the microcontroller causes the line termination and signal transmission circuit to change an impedance coupled to the telephone system, thereby causing a first flash hook operation. The off-hook detect circuit, which determines whether the telephone is in an off-hook condition, is coupled to the telephone system and the microcontroller. The signal generation circuit is coupled to the telephone system and the microcontroller and transmits a pre-recorded message to the telephone system if the first key is pressed and the telephone is in an off-hook condition. This circuit can be modified to include additional keys and additional corresponding pre-recorded messages.

The signal generation circuit can include a memory device which is programmable to store a plurality of digital signals representative of the pre-recorded message and a voice synthesizer circuit coupled to the memory device. The voice synthesizer circuit generates the pre-recorded message in response to the digital signals. The signal generation circuit can further include a microphone and/or a speaker, whereby personalized messages can be recorded and reviewed.

The present invention will be more fully understood in view of the following description and drawings.

DETAILED DESCRIPTION OF THE INVENTION

Figure 1:
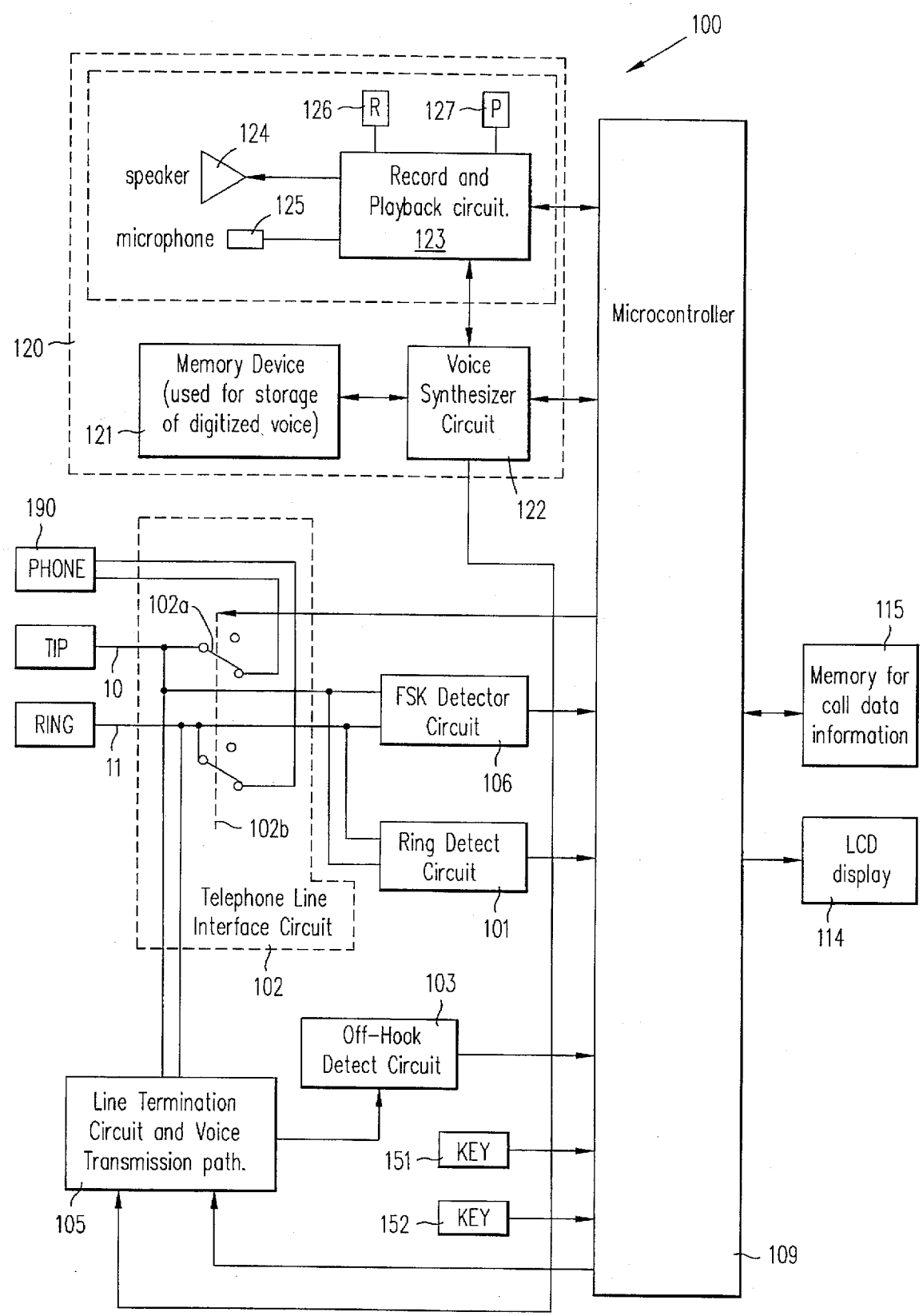
FIG. 1 is a block diagram of a CPE according to one embodiment of the present invention.

FIG. 1 illustrates CPE 100 in accordance with one embodiment of the invention. CPE 100 is coupled to a telephone company central office via tip line 10 and ring line 11. CPE 100, which is intended for use in a CID & CW system, includes ring detect circuit 101, telephone line interface circuit 102, off-hook detect circuit 103, line termination and voice transmission path circuit 105, frequency shift keying (FSK) detector circuit 106, microcontroller 109, LCD display 114, caller ID memory 115, voice generation circuit 120 and keys 151–152.

Ring detect circuit 101, telephone line interface circuit 102, FSK detector circuit 106, microcontroller 109, display 114 and caller ID memory 115 allow CPE 100 to operate as a conventional CPE in a CID & CW system. These circuit elements are briefly summarized below. Telephone line interface circuit 102 connects CPE 100 to tip and ring lines 10 and 11. Interface circuit 102 includes switches 102a and 102b which either (1) connect telephone 190 to tip and ring lines 10 and 11 in parallel with CPE 100 or (2) disconnect telephone 190 from tip and ring lines 10 and 11. Switches 102a and 102b are under the control of microcontroller 109. During the mode of operation of CPE 100 in which the user is conversing with the second party, telephone 190 is connected to tip and ring lines 10 and 11.

Interface circuit 102 connects tip and ring lines 10 and 11 to ring detect circuit 101. Ring detect circuit 101 is a conventional circuit which detects the ring signals transmitted by the telephone company central office when a second party calls the user. One embodiment of ring detect circuit 101 is described in more detail in commonly owned, co-pending U.S. patent application Ser. No. 08/388,108, entitled "CALLER ID AND CALL WAITING FOR MULTIPLE CPEs ON A SINGLE TELEPHONE LINE", by Harry W. Lewis, filed Feb. 13, 1995, herein incorporated by reference in its entirety. Each time ring detect circuit 101 detects a ring signal, ring detect circuit 101 transmits a signal to microcontroller 109 to indicate that a ring signal was received.

Interface circuit 102 also connects tip and ring lines 10 and 11 to FSK detector circuit 106. FSK detector circuit 106 is a conventional circuit which detects and decodes caller ID information transmitted by the telephone company central office as FSK signals. One embodiment of FSK detector circuit 106 is described in commonly owned, co-pending U.S. patent application Ser. No. 08/388,108, hereby incorporated by reference. FSK detector circuit 106 transmits the decoded caller ID information to microcontroller 109. Microcontroller 109, which is a conventional controller available from manufacturers such as Intel or Motorola, is connected to LCD display 114 and caller ID memory 115, thereby allowing the decoded caller ID information to be transmitted to display 114 and caller ID memory 115. LCD display 114 and caller ID memory 115 display and store the caller ID information.

In addition to the previously described circuitry, CPE 100 includes off-hook detect circuit 103, line termination and voice transmission path circuit 105, voice generation circuit 120 and keys 151–152.

Figure 2:
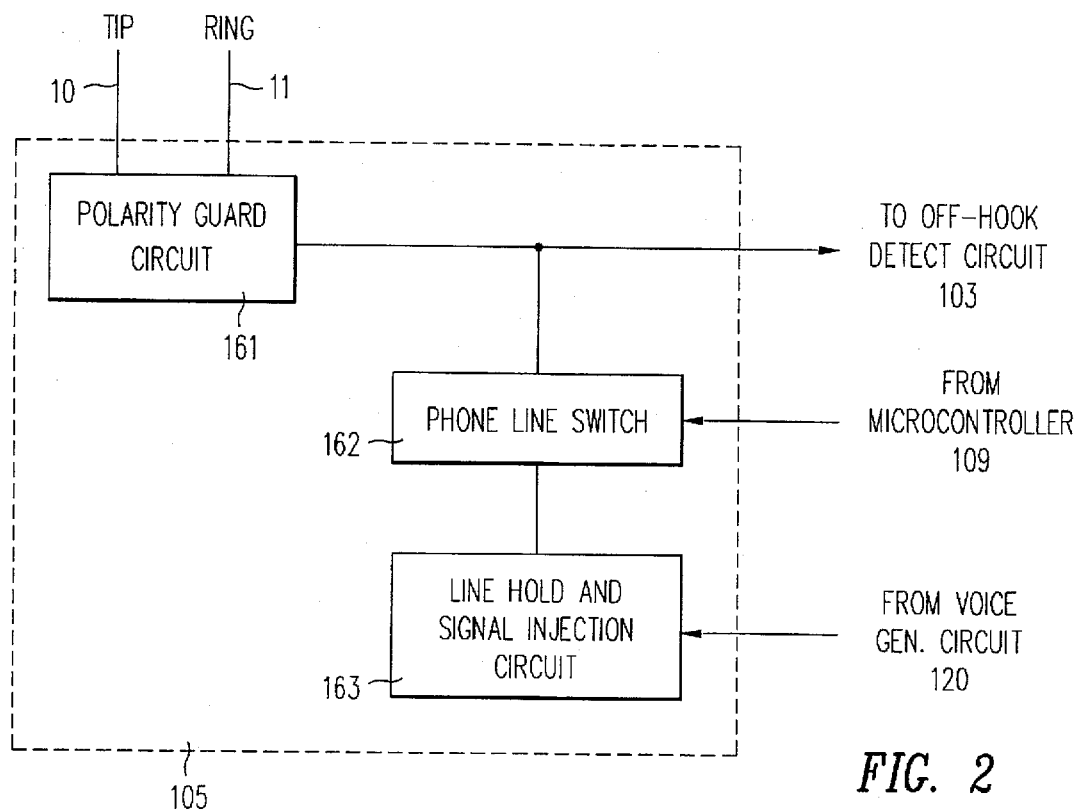
FIG. 2 is a block diagram of the line termination and voice transmission path circuit of FIG. 1.

FIG. 2 is a block diagram which illustrates line termination and voice transmission path circuit 105 in more detail. Line termination and voice transmission path circuit 105 includes polarity guard circuit 161, phone line switch 162 and line hold and signal injection circuit 163. Polarity guard circuit 161 is a conventional full wave bridge circuit coupled to tip and ring lines 10 and 11. Polarity guard circuit 161 outputs a positive voltage with respect to ground (i.e., the voltage across tip and ring lines 10 and 11), even when the tip and ring lines ar reversed due to miswiring.

Phone line switch 162 is connected between microcontroller 109 and polarity guard circuit 161. Phone line switch 162 includes circuitry which terminates and un-terminates tip and ring lines 10 and 11 in response to signals received from microcontroller 109. That is, phone line switch 162 can vary the impedance across tip and ring lines 10 and 11 to simulate on-hook and off-hook conditions.

Line hold and signal injection circuit 163 is coupled between voice generation circuit 120 and phone line switch 163. Line hold and signal injection circuit 163 provides a signal transmission path from voice generation circuit 120 to tip and ring lines 10 and 11. This signal transmission path is controlled by microprocessor 109. One embodiment of polarity guard circuit 161, phone line switch 162 and line hold and signal injection circuit 163 is described in more detail in commonly owned, co-pending U.S. patent application Ser. No. 08/388,108, hereby incorporated by reference.

Off-hook detect circuit 103 is coupled to receive the positive voltage provided by polarity guard circuit 161 of line termination and voice transmission path circuit 105. Off-hook detect circuit 103 monitors this voltage (i.e., the voltage across tip and ring lines 10 and 11) to determine whether telephone 190 is in an on-hook or off-hook condition. If the voltage across tip and ring lines 10 and 11 is less than a predetermined voltage (e.g., approximately 18 volts, ±1 volt), off-hook detect circuit 103 transmits a signal to microcontroller 109 to indicate that telephone 190 is in an off-hook condition. Conversely, if the voltage across tip and ring lines 10 and 11 exceeds the predetermined voltage, off-hook detect circuit 103 transmits a signal to microcontroller 109 to indicate that telephone 190 is in an on-hook condition. One embodiment of off-hook detect circuit 103 is described in more detail in commonly owned, co-pending U.S. patent application Ser. No. 08/388,108, hereby incorporated by reference.

In an alternative embodiment, the blocks of CPE 100 are incorporated into telephone 190. In such an embodiment, the stand-alone CPE structure is eliminated because telephone 190 now supports the features previously supported by CPE 100. In this embodiment, off-hook detect circuit 103 can be replaced with the conventional switch hook detect circuit (not shown) present in telephone 190. This switch hook detect circuit monitors the action of the hand-set being lifted off the telephone set.

Microcontroller 109 is also connected to voice generation circuit 120. Voice generation circuit 120 includes message storage device 121, voice synthesizer circuit 122, record and playback circuit 123, speaker 124, microphone 124, record key 126 and playback key 127. In other embodiments, voice generation circuit 120 can include other signal generation circuits, which generate tones or other non-voice messages.

Message storage device 121 is a memory which is capable of storing one or more digitized voice messages which correspond to keys 151 and 152. For example, storage device 121 can store a first digitized voice message corresponding to key 151 and a second digitized voice message corresponding to key 152. These first and second digitized voice messages can be stored at predetermined first and second initial addresses, respectively, within storage device 121. Although only two keys 151–152 are illustrated, other numbers of keys and messages can be used.

In a particular embodiment, storage device 121 is a read only memory (ROM) which is pre-loaded with standard messages before CPE 100 is provided to the user. In such an embodiment, record and playback circuit 123, speaker 124 and microphone 125 need not be utilized. In another embodiment, storage device 121 is a programmable volatile memory device such as static random access memory (SRAM) or dynamic random access memory (DRAM). When storage device 121 is implemented as SRAM or DRAM, a battery is required to maintain the contents of storage device 121 during a loss of power. Storage device 121 can also be a programmable non-volatile memory device such as an EPROM or an EEPROM. If storage device 121 consists of a programmable memory, storage device 121 can be pre-loaded with standard messages or can be programmed by the user to include personalized messages as described in more detail below.

Message storage device 121 is coupled to voice synthesizer circuit 122. Voice synthesizer circuit 122 is a conventional circuit which is available from manufacturers such as OKI Semiconductor (as part no. MSM6258). Voice synthesizer circuit 122 receives a signal from microcontroller 109 when one of keys 151–152 is pressed. In response, voice synthesizer circuit 122 accesses the digitized message in storage device 121 which corresponds to the pressed key. Voice synthesizer circuit 122 thereby receives a stream of digital signals from storage device 121 and in response generates an analog signal representative of a human voice. This analog signal is transmitted from voice synthesizer circuit 122 to tip and ring lines 10 and 11 through line termination and voice transmission path circuit 105.

Voice synthesizer circuit 122 is also coupled to record and playback circuit 123, speaker 124 and microphone 125. Using these elements, the user can store personalized messages in storage device 121. To store a personalized message, the user presses record key 126, thereby causing record and playback circuit 123 to couple microphone 125 to voice synthesizer circuit 122. Record and playback circuit 123 also transmits a signal to microcontroller 109 to indicate that record key 126 was pressed. Microcontroller 109 detects the pressing of record key 126 and instructs voice synthesizer circuit 122 to enter a recording mode. The user then speaks a personalized message into microphone 125, thereby causing record and playback circuit 123 to generate an analog voice signal. Record and playback circuit 123 optionally provides filtering and amplification to the signal received from microphone 125. The analog voice signal is transmitted from record and playback circuit 123 to voice synthesizer circuit 122. In the recording mode, voice synthesizer circuit 122 digitizes the analog voice signal and routes the digitized signal to storage device 121.

When the user has completed reciting the message, the user presses the key which is to correspond to the recorded message (e.g., key 151). Microcontroller 109 detects this key press and, in response, causes the digitized signal to be stored beginning at an address within storage device 121 which corresponds to the depressed key (e.g., key 151). In addition, microcontroller 109 causes record and playback circuit 123 to disconnect microphone 125 from voice synthesizer circuit 123 and instructs voice synthesizer 122 to exit the recording mode.

By pressing playback key 127 followed by the programmed key (e.g., key 151), the user can review the message stored in storage device 121. Upon pressing playback key 127, record and playback circuit 123 couples speaker 124 to voice synthesizer circuit 122. Record and playback circuit 123 also transmits a signal to microcontroller 109 to indicate that playback key 127 was pressed. The user then presses the key which corresponds to the recorded message to be reviewed (e.g., key 151). Microcontroller 109 detects the pressing of the programmed key and instructs voice synthesizer circuit 122 to enter a playback mode. In playback mode, voice synthesizer circuit 122 retrieves the digitized voice signal corresponding to the programmed key from storage device 121. Voice synthesizer circuit 122 converts the digitized voice signal to an analog voice signal, which is transmitted through record and playback circuit 123 to speaker 124 for the user's review. In an alternate embodiment, record key 126 and playback key 127 can be coupled directly to microcontroller 109.

Voice synthesizer circuit 122 is also coupled to line termination and voice transmission path circuit 105. As described in more detail below, if one of keys 151 or 152 is pressed, and neither of record or playback keys 126 or 127 is pressed, microcontroller 109 instructs voice synthesizer circuit 122 to access the digitized voice signal in storage device 121 which corresponds to the pressed key. Voice synthesizer circuit 122 converts this digitized voice signal to an analog voice signal which is transmitted to tip and ring lines 10 and 11 through line termination and voice transmission path circuit 105.

Figure 3:
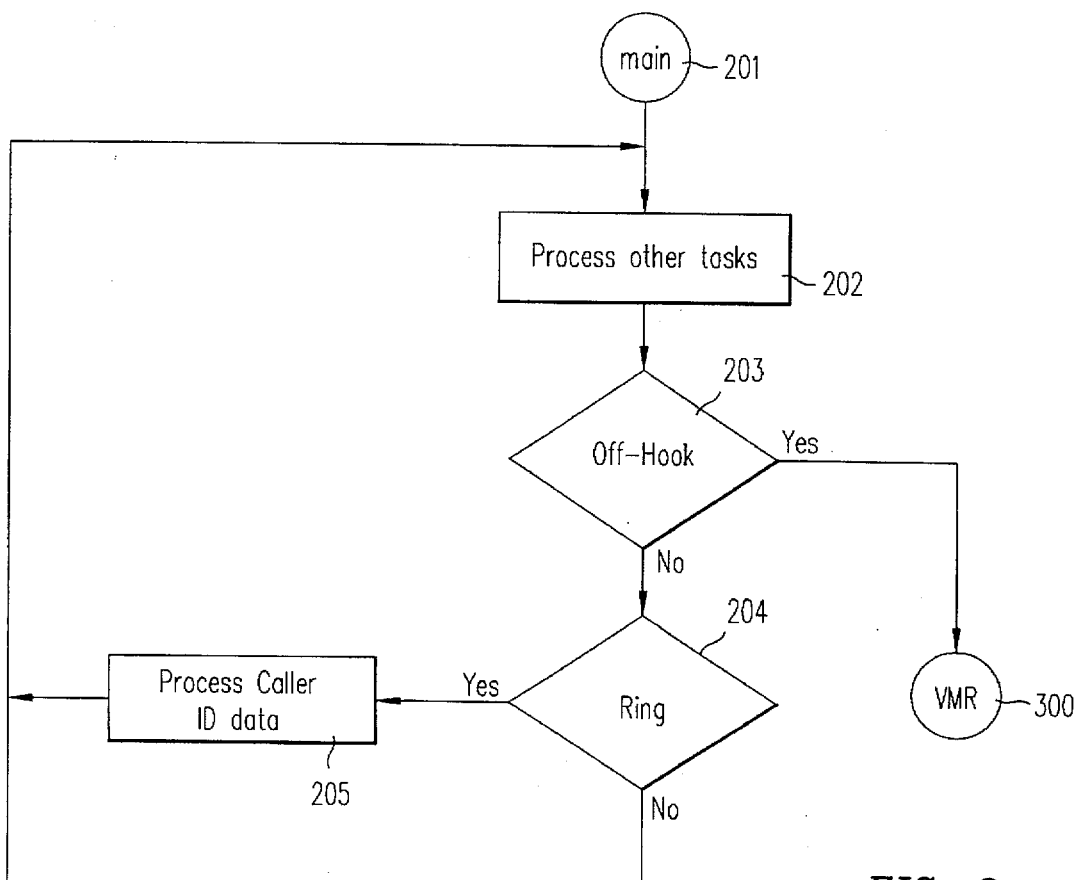
FIGS. 3 and 4 are flow diagrams illustrating operation of the CPE of FIG. 1 in accordance with one embodiment of the invention.
Figure 4:
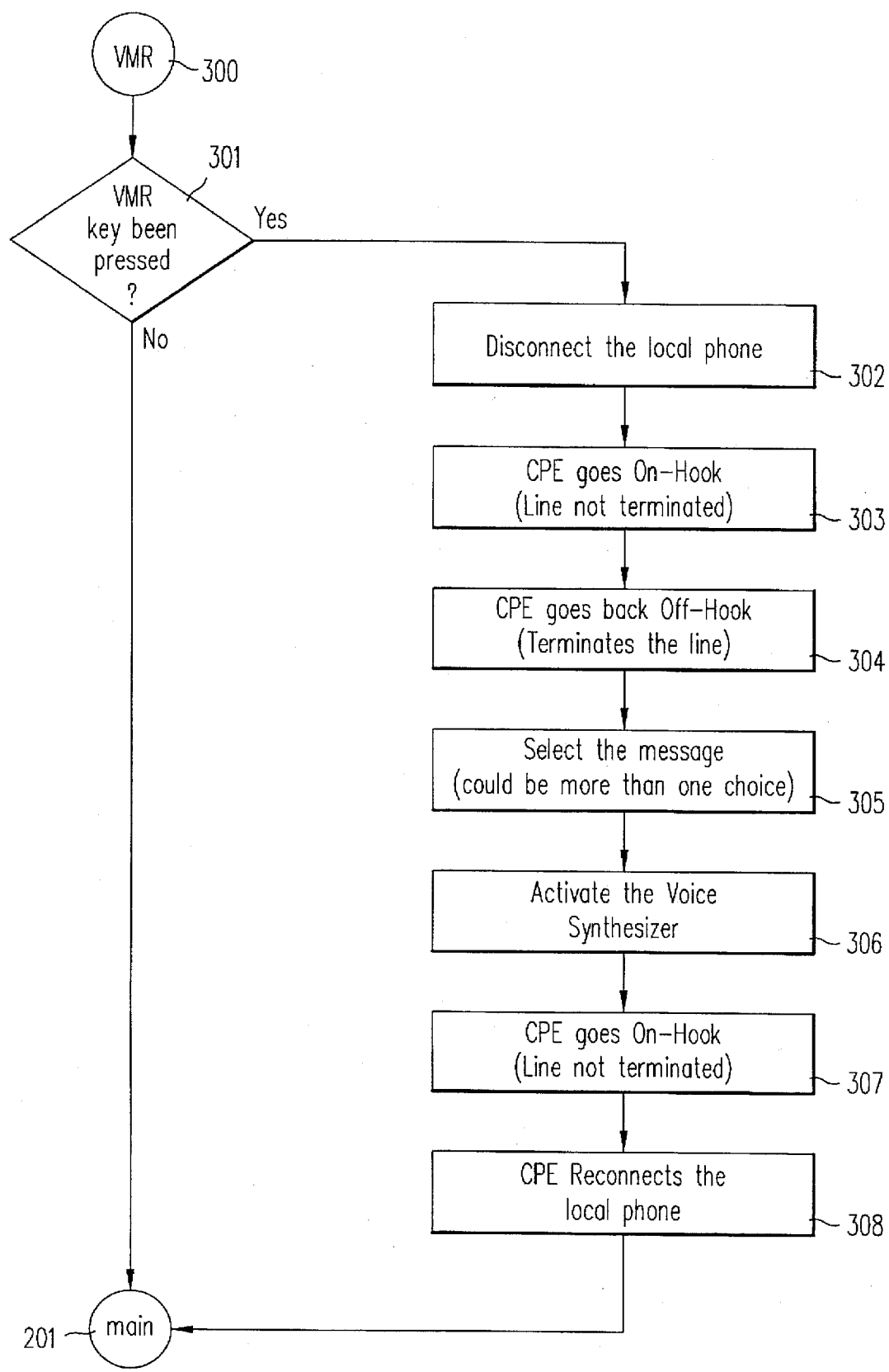

FIGS. 3 and 4 are flow diagrams which illustrate the operation of microcontroller 109 of CPE 100 in accordance with one embodiment of the invention.

Microcontroller 109 begins with main processing routine 201. Processing proceeds to step 202 in which other tasks are processed. These other tasks can include, for example, processing time/date information, processing requests entered by record key 126 or playback key 127 or monitoring the battery power of CPE 100. When Step 202 is completed, microcontroller 109 monitors the signal received from off-hook detect circuit 103 to determine whether telephone 190 is in an on-hook or off-hook condition (Step 203). The signal from off-hook detect circuit 103 is a digital signal having a first state and a second state. The state of the digital signal indicates whether telephone 190 is in an on-hook or an off-hook condition.

If telephone 190 is in an on-hook condition, processing proceeds to step 204 in which microcontroller 109 monitors the signal received from ring detect circuit 101 to determine whether a ring signal has been detected. If a ring signal is not detected, processing returns to step 202. If a ring signal is detected, processing proceeds to step 205, in which caller ID information is processed in a conventional manner. Thus, if telephone 190 is in an on-hook condition, the pressing of keys 151-152 cannot activate voice generation circuit 120.

If telephone 190 is determined to be in an off-hook condition in Step 203, processing proceeds to voice message relay (VMR) subroutine 300 (FIG. 4). Subroutine 300 begins with Step 301, in which microcontroller 109 determines whether either of keys 151 or 152 has been pressed. If neither of keys 151-152 has been pressed, processing returns to Step 201.

If the user desires to send a message to the third party in response to having heard the call waiting tone, the user may do so by pressing key 151 or 152. If one of keys 151 or 152 has been pressed, processing proceeds to Steps 302-308. In Step 302, microcontroller 109 disconnects telephone 190 from tip and ring lines 10 and 11 by actuating switches 102a and 102b. This effectively places CPE 100 in an on-hook condition because tip and ring lines 10 and 11 are not terminated.

In Step 303, microcontroller 109 causes line termination and voice transmission path circuit 105 to disconnect tip and ring lines 10 and 11, thereby preventing CPE 100 from drawing any load current. This effectively causes CPE 100 to remain in an on-hook condition. In Step 304, microcontroller 109 causes line termination and voice transmission path circuit 105 to load tip and ring lines 10 and 11, effectively placing CPE 100 in an off-hook condition.

Together, Steps 303 and 304 perform a first flash hook sequence. This flash hook sequence is equivalent to the user pressing and releasing the hookswitch of telephone 190. In a system which utilizes call waiting, a flash hook sequence allows the user to put the second party on hold and speak to the third party. Thus, at the completion of Step 304, CPE 100 is connected to the third party and the second party is on hold.

At this time, microcontroller 109 causes voice synthesizer circuit 122 to access the digital voice signal in storage device 121 which corresponds to the pressed key 151 or 152 (Step 305). In Step 306, voice synthesizer circuit 122 converts the selected digital voice signal to an analog voice signal. Microcontroller 109 activates voice synthesizer circuit 122, thereby transmitting the analog voice signal to tip and ring lines 10 and 11 through line termination and voice transmission path circuit 105. The analog voice signal is received by the third party as a voice message. During the time that the voice message is transmitted, the second party is placed on hold.

Various messages can be transmitted to the third party. For example, storage device 121 can store a predetermined message corresponding to key 151 which states, "I'm currently on the phone with another party. Please call again in five minutes." Storage device 121 can also store a predetermined message corresponding to key 151 which states, "I'm currently on the phone with another party. Please call again in thirty minutes." Such messages will provide useful information to the third party without requiring the user to speak to the third party. Other predetermined messages are contemplated and within the scope of the invention.

Record and playback circuit 123 can be used to record messages which are specific to certain occasions. For example, if the user is about to make an important phone call which cannot be interrupted, the user may record a message such as, "I'm currently on the phone with the president. I expect the conversation to be over at two o'clock. Please call back after this time." Other personalized messages are contemplated.

After the message has been transmitted to the third party, microcontroller 109 again causes line termination and voice transmission path circuit 105 to disconnect tip and ring lines 10 and 11, thereby preventing CPE 100 from drawing any load current. This effectively places CPE in an on-hook condition (Step 307). In Step 308, microcontroller 109 re-connects telephone 190 to tip and ring lines 10 and 11 by actuating switches 102a and 102b. Because telephone 190 is in an off-hook condition, a second flash hook operation is performed by steps 307 and 308. This second flash hook operation re-establishes the connection to the second party and places the third party on hold. The user can then continue the conversation with the second party. Because the user does not have to speak to the third party, there is no chance that the third party can interrupt the conversation with the second party.

Figure 5:
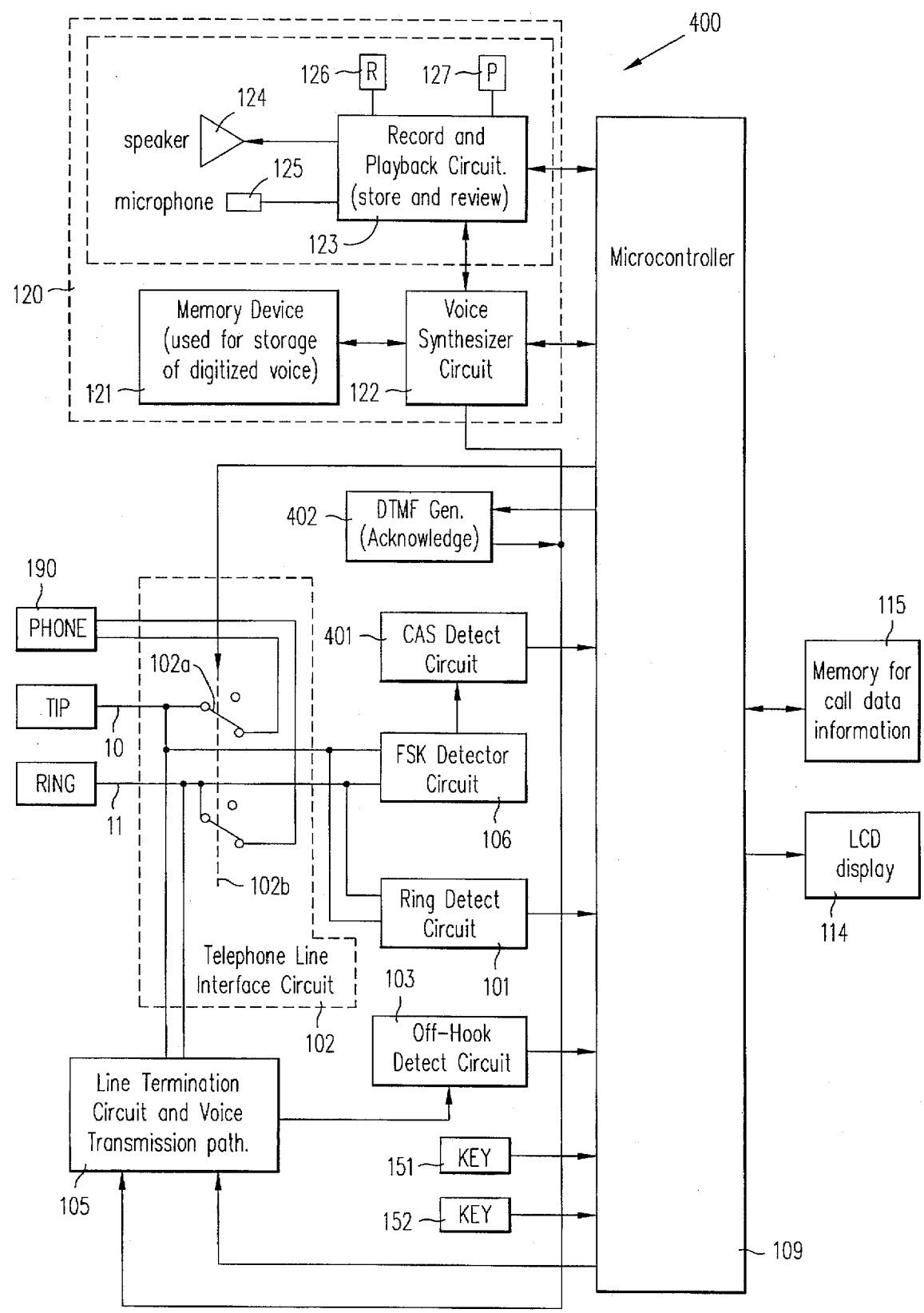
FIG. 5 is a block diagram of a CPE according to another embodiment of the present invention.

FIG. 5 is a block diagram illustrating CPE 400 in accordance with another embodiment of the invention. CPE 400 is intended for use in a system in which the telephone company central office provides caller ID with call waiting (CIDCW) service. CPE 400 uses many of the same elements as CPE 100 (FIG. 1). Elements of CPE 400 which are similar to elements of CPE 100 are labeled with the same reference numbers. Moreover, CPE 400 operates in a manner similar to CPE 100. However, as described in more detail below, CPE 400 allows the caller ID information of the third party to be displayed on display 114 before the user presses one of keys 151–152 to respond to the third party. Because the user is aware of the third party's identity, the user can better decide which message to transmit to the third party.

In addition to the blocks present in CPE 100, CPE 400 also includes CAS detect circuit 401 and DTMF generator circuit 402. CAS detect circuit 401 is coupled to tip and ring lines 10 and 11 through FSK detector circuit 106. CAS detect circuit 401 monitors tip and ring lines 10 and 11 to determine when a CAS tone is present on these lines. As previously described, the CAS tone is a tone generated by the telephone company central office when the user is speaking to a second party and a third party calls the user. CAS detect circuit 401 transmits a signal to microprocessor 109 when a CAS tone is detected.

DTMF generator circuit 402 is coupled to microcontroller 109. After a CAS tone is detected, microcontroller 109 transmits a signal to DTMF generator circuit 402, thereby causing DTMF generator circuit 402 to generate an acknowledge signal. This acknowledge signal is transmitted to tip and ring lines 10 and 11 through line hold and signal injection circuit 163, phone line switch 162 and polarity guard circuit 161 (FIG. 2). The acknowledge signal can be transmitted using the same path used to transmit signals from voice generation circuit 120 to line termination and voice transmission path circuit 105. Alternatively, separate paths to line termination and voice transmission path circuit 105 can be provided for DTMF generator circuit 402 and voice generation circuit 120. The acknowledge signal is transmitted to the telephone company central office on tip and ring lines 10 and 11. Upon receiving the acknowledge signal, the central office transmits the caller ID information of the third party to CPE 400 on tip and ring lines 10 and 11. This caller ID information is processed as previously described and displayed on display 114.

Figure 6:
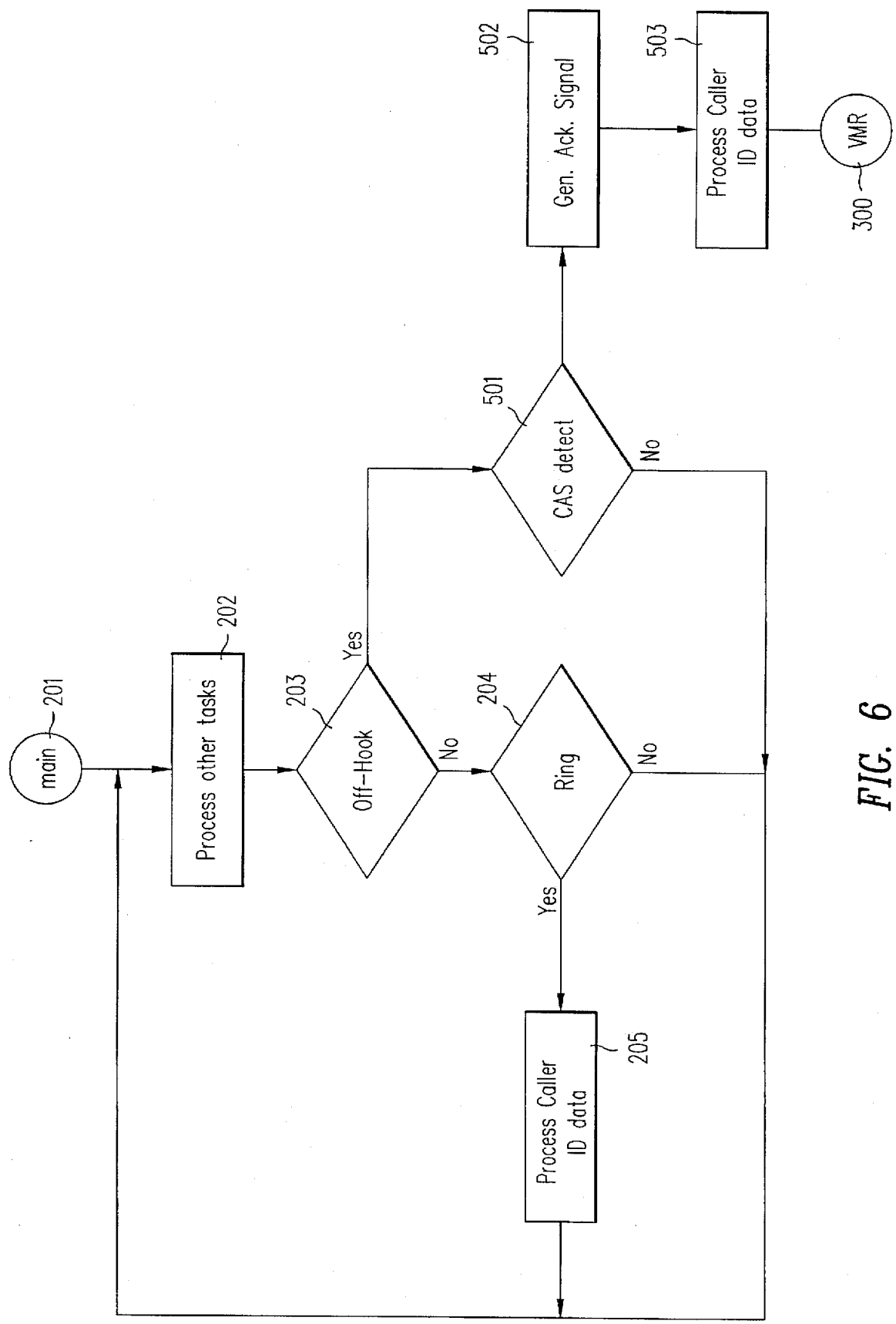
FIG. 6 is a flow diagram illustrating operation of the CPE of FIG. 5 in accordance with an embodiment of the invention.

FIG. 6 is a flow diagram illustrating the operation of CPE 400. The steps of FIG. 6 are similar to the steps of FIG. 3. Similar steps are labeled with the same numbers. In FIG. 6, if an off-hook condition is detected in Step 203, processing proceeds to Step 501 in which microprocessor 109 determines whether a CAS tone has been detected by CAS detect circuit 401 (FIG. 5). If no CAS tone has been detected, processing continues with Step 201. If a CAS tone has been detected, microcontroller 109 causes DTMF generator 402 (FIG. 5) to generate an acknowledge signal (Step 502). Microcontroller 109 then receives the caller ID information of the third party from FSK detector circuit 106 (FIG. 5) and displays this information on display 114 (Step 503). Processing then proceeds to voice message relay subroutine 300 (FIG. 4).

Because CPE 400 provides the user with the caller ID information of the third party, the user can select a response in a more informed manner. For example, key 151 may correspond to the message: "I'm currently on the phone with another party. I have your caller ID information and will call you back when I complete my current conversation." In addition, key 152 may correspond to a message intended to deter solicitors or other unwanted calls, such as: "I'm sorry, but the party you have called does not wish to accept your call." Many other messages are contemplated and within the scope of the invention.

While the present invention has been described in connection with a particular embodiment, it is understood that the invention is not limited to the embodiment disclosed, but is capable of various modifications which would be apparent to one of ordinary skill in the art. Thus, the present invention is limited only by the following claims.

What is claimed is:

1. A method for allowing a user of a customer premises equipment (CPE) engaged in a telephone call with a second party to respond to an incoming call from a third party in a telephone system having call waiting, wherein the telephone system generates an alerting signal to alert the user of the incoming call, the method comprising the steps of:

receiving the alerting signal by the CPE;

monitoring the telephone system by the CPE to determine whether the CPE is in an off-hook condition;

monitoring a first key of the CPE to determine if the user activates the first key in response to the received alerting signal;

if the first key is activated by the user in response to the received alerting signal at any time that the CPE is in an off-hook condition, then performing a first flash hook operation by the CPE to place the second party in a hold state and connect the CPE to the third party; and then transmitting a pre-recorded message corresponding to the first key from the CPE to the third party; and then performing a second flash hook operation by the CPE to disconnect the CPE from the third party, remove the second party from the hold state and reconnect the CPE to the second party.

2. The method of claim 1, wherein the CPE comprises a telephone, the method further comprising the steps of:

disconnecting the telephone from the telephone system after the first key is activated; and re-connecting the telephone to the telephone system after the second flash hook operation.

3. The method of claim 1, wherein the CPE comprises a telephone, and wherein the step of performing the first flash hook operation further comprises the steps of:

disconnecting the telephone from the telephone system, thereby presenting an on-hook condition to the telephone system;

coupling a first impedance to the telephone system by the CPE to simulate the telephone in an on-hook condition; and then coupling a second impedance to the telephone system by the CPE to simulate the telephone in an off-hook condition.

4. The method of claim 1, wherein the step of transmitting a pre-recorded message further comprises the steps of:

retrieving a plurality of digital signals from a memory device; and generating the pre-recorded message in response to the digital signals.

5. The method of claim 1, further comprising the steps of:

pressing a recording key of the CPE;

announcing an audible message to a microphone of the CPE;

converting the audible message to a plurality of digital signals by the CPE; and storing the digital signals in a memory of the CPE as the pre-recorded message.

6. The method of claim 1, further comprising the steps of:

monitoring a second key to determine if the user activates the second key in response to the received alerting signal;

if the second key is activated by the user in response to the received alerting signal at any time that the CPE is in an off-hook condition, then performing a flash hook operation by the CPE to place the second party in a hold state and connect the CPE to the third party; and then transmitting a second pre-recorded message corresponding to the second key from the CPE to the third party; and then performing a flash hook operation by the CPE to disconnect the CPE from the third party, remove the second party from the hold state and reconnect the CPE to the second party.

7. The method of claim 1, further comprising the steps of:

receiving caller identification information associated with the third party by the CPE; and displaying the caller identification information of the third party by the CPE.

8. A customer premises equipment (CPE) for allowing a user engaged in a telephone call with a second party to respond to an incoming call from a third party in a telephone system having call waiting, wherein the telephone system generates an alerting signal to alert the user of the incoming call, the CPE comprising:

a first key;

an off-hook detection circuit for determining if the CPE is in an off-hook condition;

a microcontroller coupled to the first key and the off-hook detection circuit, wherein the microcontroller monitors the off-hook detection circuit to determine if the CPE is in an off-hook condition, the microcontroller further monitoring the first key to determine if the user activates the first key in response to the alerting signal;

a line termination circuit coupled to the microcontroller, wherein the microcontroller causes the line termination circuit to perform a first flash hook operation to place the second party in a hold state and connect the CPE to the third party placing the incoming call if the microcontroller detects that the user activates the first key when the CPE is in an off-hook condition; and a signal generation circuit coupled to the microcontroller and the line termination circuit, wherein the microcontroller causes the signal generation circuit to transmit a pre-recorded message corresponding to the first key to the third party after the first flash hook operation has been performed, and further wherein the microcontroller causes the line termination circuit to perform a second flash hook operation to disconnect the CPE from the third party, remove the second party from the hold state and reconnect the CPE to the second party after the prerecorded message is transmitted.

9. The CPE of claim 8, wherein the signal generation circuit comprises:

a memory device which is programmable to store a plurality of digital signals representative of the pre-recorded message;

a voice synthesizer circuit coupled to the memory device, wherein the voice synthesizer circuit generates the pre-recorded message in response to the digital signals.

10. The CPE of claim 9, wherein the signal generation circuit further comprises a microphone coupled to the voice synthesizer circuit, whereby audio signals transmitted to the microphone can be converted into digital signals and stored in the memory device.

11. The CPE of claim 9, wherein the signal generation circuit further comprises a speaker coupled to the voice synthesizer circuit, whereby the pre-recorded message is transmitted to the speaker.

12. The CPE of claim 8, further comprising a second key coupled to the microcontroller, wherein the microcontroller monitors the second key to determine if the user activates the second key in response to the alerting signal, and wherein the microcontroller causes the line termination circuit to perform a first flash hook operation to place the second party in a hold state and connect the CPE to the third party if the microcontroller detects that the user activates the second key when the CPE is in an off-hook condition, wherein the microcontroller causes the signal generation circuit to transmit a second pre-recorded message corresponding to the second key to the third party after the first flash hook operation has been performed, and further wherein the microcontroller causes the line termination circuit to perform a second flash hook operation to disconnect the CPE from the third party, remove the second party from the hold state and reconnect the CPE to the second party after the second pre-recorded message is transmitted.

13. The CPE of claim 8, further comprising:

a telephone; and an interface circuit coupled to the microcontroller, the telephone and the telephone system, wherein the interface circuit has a first configuration in which the telephone is connected to the telephone system and a second configuration in which the telephone is disconnected from the telephone system, wherein the configuration of the interface circuit is controlled by the microcontroller.

14. The CPE of claim 8, further comprising:

means for receiving caller identification information of the third party, wherein the means for receiving are coupled to the telephone system; and means for displaying the caller identification information of the third party.

15. The CPE of claim 8, wherein the signal generation circuit produces a voice message.

16. A method for allowing a user of a customer premises equipment (CPE) engaged in a telephone call with a second party to respond to a plurality of incoming calls from one or more third parties, wherein the telephone system provides an alerting signal to alert the user of the CPE with each of the incoming calls, the method comprising the steps of:

receiving a first alerting signal associated with a first incoming call placed by a third party, wherein the alerting signal is received by the CPE;

actuating a first key by the user in response to the first alerting signal;

sending a first pre-recorded message by the CPE to the third party placing the first incoming call in response to the actuating of the first key;

receiving a second alerting signal associated with a second incoming call placed by a third party, wherein the alerting signal is received by the CPE;

actuating a second key by the user in response to the second alerting signal;

sending a second pre-recorded message by the CPE to the third party placing the second incoming call in response to the actuating of the second key, wherein the first and second pre-recorded messages are different.

17. A customer premises device (CPE) for allowing a user engaged in a telephone call with a second party to respond to an incoming call from a third party in a telephone system having call waiting, the CPE comprising:

means for receiving the alerting signal;

means for monitoring the telephone system to determine if the CPE is in an off-hook condition;

means for monitoring a first key of the CPE to determine if the user activates the first key in response to the received alerting signal;

means for performing a first flash hook operation to place the second party in a hold state and connect the CPE to the third party if the first key is activated by the user in response to the received alerting signal at any time that the CPE is in an off-hook condition;

means for transmitting a pre-recorded message corresponding to the first key from the CPE to the third party; and means for performing a second flash hook operation to disconnect the CPE from the third party, remove the second party from the hold state and reconnect the CPE to the second party.

* * * * *